3,113,078
SLIME CONTROL IN CULTURE MEDIA
Wesley Brock Neely, Midland, Mich., assignor to The Dow Chemical Company, Midland, Mich., a corporation of Delaware
No Drawing. Filed Feb. 10, 1959, Ser. No. 792,264
5 Claims. (Cl. 195—96)

This invention relates to a method for controlling the growth of slime producing organisms in culture media and, in general, in industrial systems handling large volumes of water on fluids involved in processing carbohydrate type materials which can serve as a growth or culture medium for slime producing organisms.

Industrially it is common to have the slime producing organism *Leuconostoc mesenteroides* cultivated for purposes of producing dextran and polymers of sucrose related to dextran. This controlled operation has its advantages in the production of this industrial material. Related to this organism are others which contaminate culture media, tending to produce slime in situations where it is not desired.

It, accordingly, is a fundamental object of this invention to provide a method of controlling and eliminating the production of slime in culture media and their related systems in which slime producing organism can flourish.

Other objects and advantages of the invention will in part be obvious and in part appear hereinafter.

It has been discovered according to my invention that the production of polysaccharide slime by bacterial organisms requires a certain minimum amount of calcium. It appears that this calcium is necessary for the physiological processes by which these organisms thrive and produce the polysaccharide slime.

Accordingly, I have discovered that if, in the medium, the level of the calcium ion is reduced to a starvation point, the organism will not flourish and control is thereby established. My process depends on adjustment of the pH of the medium in which control is to be applied to a very efficient level for chelation of calcium and thereupon chelating the calcium with a chemical compound which holds it in complex form most efficiently at the selected pH. By so doing I have found that the growth of the slime producing organism can be virtually completely prevented.

The preferred compounds for use in the chelation of calcium in accordance with this invention are certain synthetic amino acids, which are not metabolized, typified by ethylenediaminetetraacetic acid. Some of the less effective compounds, most probably because they are metabolized, are organic complexing acids such as citric acid, tartaric acid and oxalic acid.

Past practice in the prevention of undesirable by-products from the growth of micro-organisms in culture systems is by the use of chemical agents which kill the undesired micro organisms. This approach has led to the development of a tremendous variety of agents which possess more or less specific action, but lead to the fundamental defect that after a few generations of effectiveness in terms of the organism against which it is designed to operate, the organism adapts itself to tolerate the chemical agent and, thereupon, the efficiency of the chemical killing agent is materially reduced. The approach in accordance with my invention is in direct contrast to this in that it inhibits the reaction which causes the formation of the undesired slime by starving the organisms, or effectively removing from solution the calcium on which its metabolism is dependent. In such a situation I have found that the organism shows no appreciable tendency to adapt itself to the chemical used to render the calcium available to it.

In general terms, therefore, the theory of the process is to control growth of an undesirable slime producing organism by starving it, by reacting a physiologically essential metal with a chelating agent in the medium in which the organism occurs, thereby to render the metal unavailable for further reproduction of the organism.

In specific illustration of the process, reference to the organism *Leuconostoc mesenteroides* may be made. This is an organism that produces a thick heavy slime, which in many processes is very undesirable and its prevention in such situations is important. In a study of the enzymatic synthesis of the slime it was discovered that calcium ions were essential for activity of the synthesizing enzyme. The use of chelating agents to render calcium ion unavailable to the organism and thus prevent slime production was successful. The invention will work equally well for the prevention of slime by calcium dependent organisms other than *Leuconostoc mesenteroides*. The process will be better understood by reference to the following examples:

Medium for *Leuconostoc mesenteroides* consisted of the following: Yeast extract 2.0 percent, Sucrose 2.0 percent, $K_2HPO_4$ 2.0 percent, R salts 0.5 percent (R salts contain 40 grams $MgSO_4.7H_2O$, 2 grams NaCl, 2 grams $FeSO_4.7H_2O$ and 2 grams $MnSO_4.H_2O$ made up to liter) and $H_3PO_4$ 0.1 percent. This medium was inoculated with an actively growing culture of *Leuconostoc mesenteroides* NRRL B512–F. At the end of 24 hours a thick heavy slime was formed in the flask.

In parallel tests the addition of 0.05 percent ethylenediaminetetraacetic acid completely prevented the formation of this slime as well as inhibited growth of the organism.

The inhibition of the growth of the organism is observed equally effectively when compounds such as β-hydroxy ethylethylenediaminetriacetic acid, diethylenetriaminepentaacetic acid, a monohydroxy ethyldiethylenetriaminetetraacetic acid and alkali metal salts of the base chelating agents, are used in corresponding amounts in place of ethylenediaminetetraacetic acid described. It seems that since the organism is directly calcium dependent, adjustment of the pH of the medium to a level of about 6–8, that is, approximately neutral, places the pH in the range in which the chelating agent is of maximum effectiveness, whereupon calcium is rendered chemically not available in the solution, and the organism becomes starved.

Though the invention has been described with reference to only a limited number of examples, it is to be understood that variants thereof may be practiced without departing from its spirit or scope.

What is claimed is:

1. The method of controlling polysaccharide slime producing organism growth in an aqueous system wherein such growth occurs which comprises, incorporating into the aqueous base a chelating agent selected from the group consisting of ethylenediaminetetraacetic acid, β-hydroxyethylethylenediaminetriacetic acid, diethylenetriaminepentaacetic acid, monohydroxyethyldiethylenetriaminetetraacetic acid and alkali metal salts thereof, and maintaining the concentration of said chelating agent at a level in the range from about 0.01 percent to about 1.0 percent.

2. The method in accordance with claim 1 in which the chelating agent is ethylenediaminetetraacetic acid.

3. The method in accordance with claim 1 in which the chelating agent is β-hydroxyethylethylenediaminetriacetic acid.

4. The method in accordance with claim 1 in which the chelating agent is diethylenetriaminepentaacetic acid.

5. The method in accordance with claim 1 in which the chelating agent is a monohydroxyethyldiethylenetriaminetetraacetic acid.

References Cited in the file of this patent

Martell et al.: "Chemistry of the Metal Chelate Compounds" (1952), pp. 136, 137, 499 and 537, published by Prentice-Hall Inc., Englewood Cliffs, N.J.

Werkman et al.: "Bacterial Physiology" (1951), page 505, published by Academic Press Inc., New York.